July 11, 1939. J. OSWALD 2,165,648
GRILLE CONSTRUCTION
Filed July 19, 1937 2 Sheets-Sheet 1
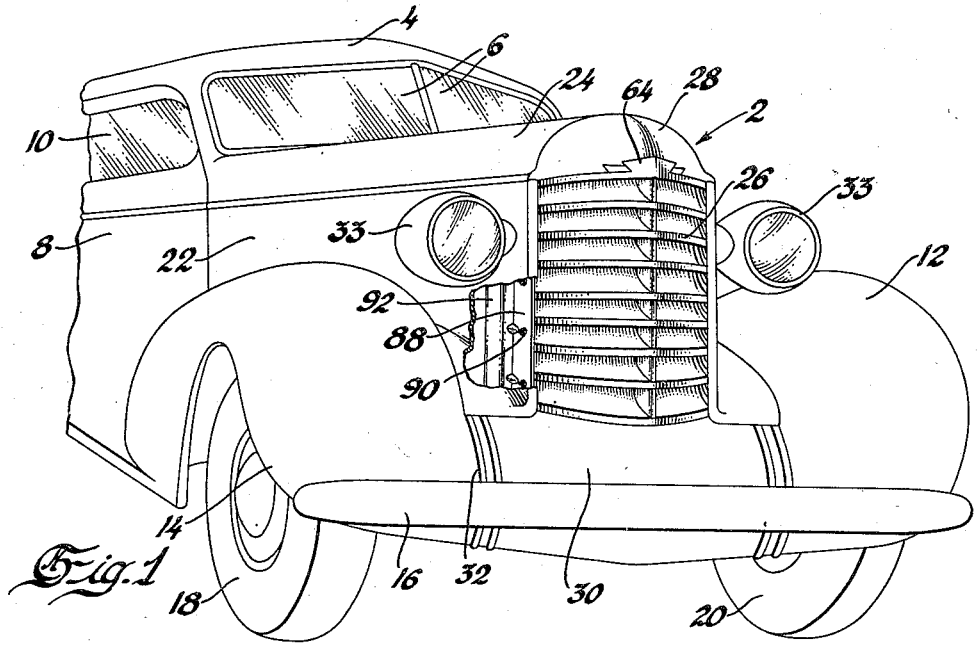
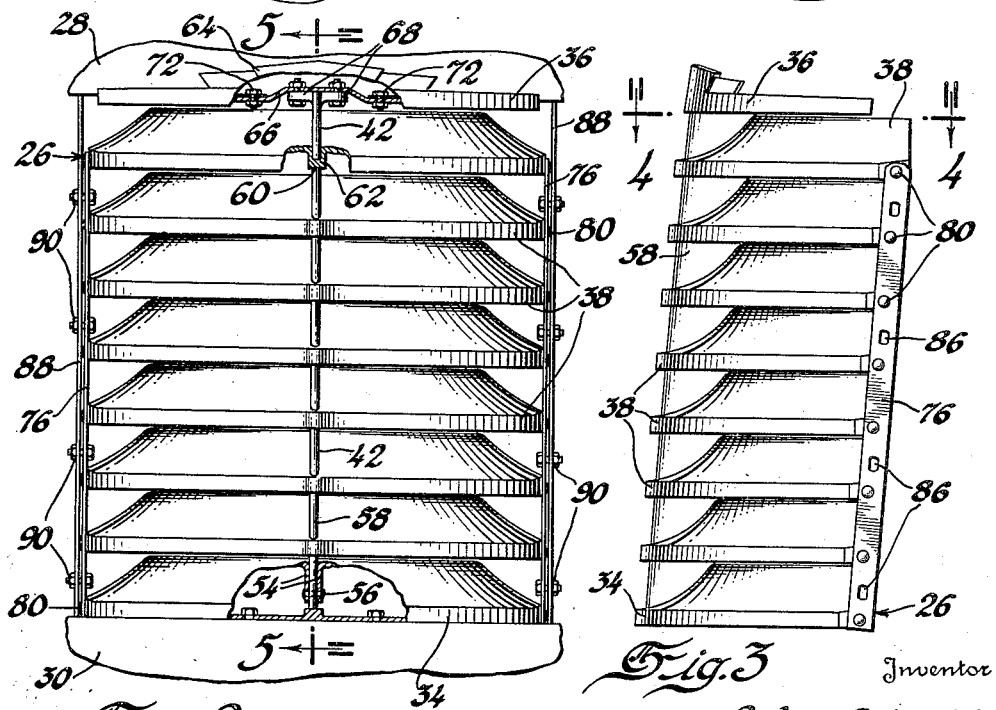
Inventor
John Oswald

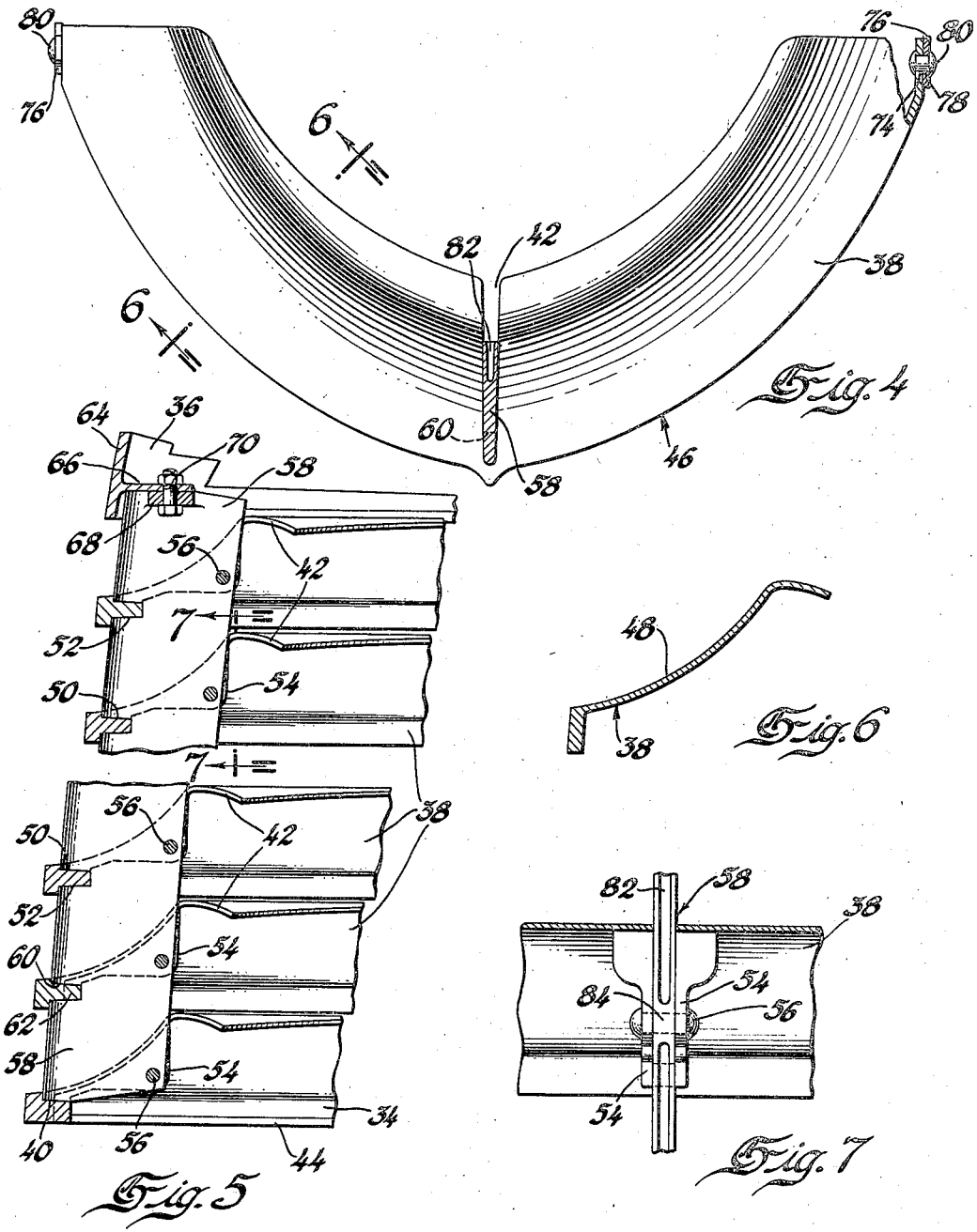

Patented July 11, 1939

2,165,648

UNITED STATES PATENT OFFICE 2,165,648

GRILLE CONSTRUCTION

John Oswald, Lansing, Mich., assignor to General Motors Corporation, Detroit, Mich., a corporation of Delaware Application July 19, 1937, Serial No. 154,341

4 Claims. (Cl. 293—54)

This invention relates to grilles for the radiators of automotive vehicles.

The novelty of the invention consists in making a plurality of single cast louvers and arranging them one above the other and securing the louvers together at their ends and in the middle, the louvers being in the form of arcs and in addition having a general transverse curvature inward and upward. The louvers are spaced relatively wide apart to allow a relatively easy access of air to the radiator core which is positioned a considerable distance behind the grille. The louvers of the grille are generally of the same construction with the exception of the lowermost and the uppermost which have a slightly different construction to enable them properly to interfit with the adjacent parts of the vehicle.

On the drawings:

Figure 1 is a perspective view of the front of an automotive vehicle showing the grille and having parts broken away to show the manner of attaching the grille to its supporting structure.

Figure 2 is an enlarged sectional elevational view of the grille with parts broken away and shown in section better to show the construction.

Figure 3 is a side view of the structure of Figure 2.

Figure 4 is an enlarged sectional detailed view on the line 4—4 of Figure 3.

Figure 5 is an enlarged sectional detailed view on the line 5—5 of Figure 2 with the intermediary part of the grille broken away.

Figure 6 is a sectional detailed view on the line 6—6 of Figure 4.

Figure 7 is a sectional detailed view on the line 7—7 of Figure 5.

Referring to the drawings, the numeral 2 indicates the vehicle as a whole. The vehicle has the metal top 4, the divided windshield 6, the doors 8, door windows 10, fenders 12 and 14, bumpers 16, front wheels 18 and 20, rigid side panels 22 and hinged hood 24. The grille is indicated as a whole at 26 and on the top thereof has the cap piece 28 and below the grille there is the base piece 30, the fenders and base piece being joined along the line indicated at 32. The headlamps are indicated at 33.

Referring to Figures 2 and 3, the grille 26 comprises the base louver 34, the top louver 36, and the intermediary louvers 38. The base louver 34 differs slightly in shape from the rest of the louvers and the cross sectional shape thereof is best shown in Figure 5. All of the louvers are arcuate in plan view as is best shown in Figure 4, and at the front center of the base louver 34 there is a rabbeted part 40 which is a continuation of a cutout portion or recess 42 formed at the mid part of the louver. The bottom 44 of the base louver is flat and rests upon the top of the base piece 30, the base piece conforming in shape to the arc of the louver 34.

The intermediary louvers 38 are all of the same shape as is best shown in Figures 4 and 6. The louvers have an arcuate exterior indicated at 46 and are upwardly and inwardly curved as indicated at 48 in Figure 6. At the front middle part each intermediate louver 38 has a rabbet 50 at its upper part, and the rabbet 52 at its lower part, the upper rabbet 50 forming a continuation of a recess or cutout 42 similar to the recess or cutout 42 of the lowermost base louver 34. At each side of the recess 42 each louver 34 and 38 is provided with ears 54, each ear having an opening for the reception of a pin or rivet 56. The pin or rivet 56 also passes through the inner edge of a center rib or post 58 which has a plurality of notches 60 therein, the notches conforming to the ribs 62 at the center front part of each louver 38. The rib or post 58 fits into the recesses 42 between the ears 54 and aids in rigidly holding the louvers together and in spaced relation.

The uppermost louver 36 carries a name plate part 64 on which the insignia of the automobile may be engraved or etched. The louver 36 has the inwardly extending flange 66 which rests on the extension 68 at the top of the rib 58. The flange 66 is secured to the extension 68 by means of the bolts 70 which pass through the corresponding openings in the rib and extension. Additional bolts 72 pass through the flange 68 and are secured to inturned flanges on the lowermost edge of the cap 28.

The ends or extremities of each louver each has an opening 74 and side bars 76 are provided with suitable uniformly or evenly spaced openings 78. Through the openings 74 and 78 rivets 80 are passed rigidly to hold the louvers 34, 36, and 38 together at their sides and to keep the spacing at the sides in the same relation as the spacing at the center produced by the interengagement of the rib 58 with the mid part of the louvers.

Referring to Figures 4 and 7, the rib 58 is shown to be hollow for part of its length as indicated at 82. Where the rivets 56 pass through the rib 58 and the ears 54 the rib is solid as indicated at 84.

With the louvers held together at their middle by the rib 58 and at their sides by the bars 76 the grille 26 is ready to be placed on the vehicle. The bars 76 are provided with suitable openings 86 by means of which they are secured to the filler plates 88 by means of the bolts 90. The filler plates extend from the side of the louvers rearwardly where they are secured to a U-shaped brace 92 to which the radiator core is secured and which extends substantially from the top of the radiator core downwardly to the transverse member of the chassis and is mounted on the frame in the manner shown in the Waterbury Patent 2,004,258.

I claim:

1. In a grille for the radiator of an automotive vehicle, a base louver extending transversely of the front of the vehicle, a plurality of similar, intermediary, widely-spaced, transverse louvers over the base louver, a top louver spaced from the transverse louvers, all of said louvers being arcuate, means at the sides of the louvers and secured to each and holding the louvers together in spaced relation, each of said intermediate louvers having a recess at substantially its middle part, a strengthening rib extending vertically of the grille and into the recesses, and means to secure the rib to each louver.

2. In a grille for the radiator of an automotive vehicle, a base louver extending transversely of the front of the vehicle, a plurality of similar intermediary widely spaced transverse louvers over the base louver, a top louver spaced from the transverse louvers, all of said louvers being arcuate, means at the sides of the louvers and secured to each and holding the louvers together in spaced relation, each of said intermediate louvers having a recess at substantially its mid part, ears on said intermediate louvers at the sides of the recess, a strengthening rib extending vertically of the grille and into the recesses, and means to secure the rib to each ear.

3. In a grille for the radiator of an automotive vehicle, a plurality of arcuate vertically spaced louvers, said louvers having a transverse upward and inward curvature, said louvers having openings at the ends of their arcs, vertical bars, one bar at each side of the grille, said bars having openings corresponding to openings in the louvers, and means passing through the openings in the bars and the louvers to secure the louvers together and hold them in vertically spaced relation.

4. In a grille for the radiator of an automotive vehicle, a plurality of arcuate vertically spaced louvers, said louvers having a recess at substantially the middle of each, a rib in the recess and secured to the louvers, extensions at the top of the rib, said extensions abutting against the topmost louver, means to secure the extensions to the topmost louver, and means at the ends of the arcs to secure the louvers together and in spaced relation.

JOHN OSWALD.